United States Patent [19]
Birchall et al.

[11] 4,377,418
[45] Mar. 22, 1983

[54] PARTICULATE FILLER, COATED WITH MATERIAL BONDED THERETO AND CONTAINING A SULFUR-CONTAINING GROUP WHICH RELEASES SULFUR AS A CURING AGENT FOR S-CURABLE UNSATURATED POLYMERS

[75] Inventors: James D. Birchall, Mouldsworth; John G. Carey, Appleton, both of England

[73] Assignee: Imperial Chemical Industries Limited, London, England

[21] Appl. No.: 242,409

[22] Filed: Mar. 10, 1981

[30] Foreign Application Priority Data

Mar. 21, 1980 [GB]  United Kingdom ............... 80 09570

[51] Int. Cl.$^3$ ........................ C08K 9/04; C08L 21/00
[52] U.S. Cl. ................. 106/306; 106/288 B; 106/291; 106/292; 106/296; 106/308 F; 106/308 S; 106/308 Q; 106/308 M; 523/200; 523/205; 524/571; 524/575
[58] Field of Search ............... 106/306, 308 F, 308 S, 106/308 M, 308 Q, 308 N; 523/200, 211

[56] References Cited

U.S. PATENT DOCUMENTS

| | | |
|---|---|---|
| 4,099,981 | 7/1978 | Mui et al. ..................... 106/308 Q |
| 4,156,677 | 5/1979 | Williams et al. ................. 523/213 |
| 4,191,670 | 3/1980 | Strauch ......................... 106/308 F |
| 4,210,459 | 7/1980 | Williams et al. .............. 106/308 N |
| 4,255,303 | 3/1981 | Keogh ............................ 523/200 |

FOREIGN PATENT DOCUMENTS

| | | |
|---|---|---|
| 867333 | 11/1978 | Belgium . |
| 52-63947 | 5/1977 | Japan ................................ 523/200 |
| 53-64256 | 6/1978 | Japan ................................ 523/200 |
| 55-45741 | 3/1980 | Japan . |
| 55-113619 | 9/1980 | Japan ................................ 106/306 |

*Primary Examiner*—Helen M. McCarthy
*Attorney, Agent, or Firm*—Cushman, Darby & Cushman

[57] ABSTRACT

A coated particulate filler having bound thereto a material comprising an acidic group reactive with the filler and a sulphur-containing group which is not reactive with the filler but which is decomposable to a sulphur-containing species which is capable of taking part in a sulphur-based curing reaction, a composition containing the filler and an organic polymeric material which contains ethylenic unsaturation and which is curable by reaction with sulphur, a process for producing the coated particulate filler, and a process for producing the composition.

9 Claims, No Drawings

PARTICULATE FILLER, COATED WITH MATERIAL BONDED THERETO AND CONTAINING A SULFUR-CONTAINING GROUP WHICH RELEASES SULFUR AS A CURING AGENT FOR S-CURABLE UNSATURATED POLYMERS

This invention relates to a particulate filler and to a polymer composition containing the particulate filler.

It is well known to modify the properties of a wide variety of organic polymers by incorporating into such polymers one or more inorganic materials in finely divided form. These inorganic materials, commonly known as fillers, are generally less expensive than organic polymers and they may serve to increase the bulk of the resultant polymer composition and so permit an organic polymer to be used more economically, and they may also serve to enhance at least some of the physical properties of the organic polymer, for example the hardness, tensile modulus, tensile strength, or resistance to wear of the polymer.

Not only is it desirable to make such particulate fillers as compatible as possible with organic polymers but it is also desirable to be able to make a composition containing a high proportion of filler so as to confer the physical advantages of the filler on the resultant composition to the maximum practicable extent. It is especially desirable, when considering possible shortages of hydrocarbon raw materials, to be able to use cheap and readily available particulate fillers as much as possible.

It is known to improve the properties of an organic polymer composition containing a given proportion of a particulate filler by providing a chemical link between the filler and the polymer of the composition. The provision of such a chemical link generally results in an improvement in at least the tensile properties of the polymer composition, for example in the tensile strength and/or the tensile modulus, when compared with the properties of a composition in which the filler is not so chemically linked.

For example, in our British patent application No. 22277/77, published as Belgian Pat. No. 867333, we have described the production of a coated particulate filler by a process which comprises binding to the surface of a basic particulate filler an acidic group-containing organic polymer, which polymer contains at least one ethylenically unsaturated group and which has a molecular weight of not greater than 100,000.

When such a coated particulate filler is incorporated into an organic polymer composition the filler may be chemically linked to the polymer of the composition through the ethylenically unsaturated group in the polymer of the coating. For example, where the polymer of the composition contains ethylenic unsaturation, for example where it is an ethylenically unsaturated elastomer, the polymer of the coating on the basic particulate filler may be chemically linked to the polymer of the composition by conventional elastomer curing, for example by means of a peroxide cure or by means of a sulphur-based cure.

The present invention relates to a polymer composition containing a coated particulate filler in which the coating on the filler is chosen such that it is particularly suitable for use in an organic polymer composition which is to be subjected to a conventional sulphur cure.

The present invention provides a composition comprising:

(i) an organic polymeric material which contains ethylenic unsaturation and which is curable by reaction with sulphur, and (ii) a particulate filler to the surface of which there is bound a material comprising at least one acidic group reactive with the filler which group is linked directly or indirectly to at least one sulphur containing group which is not reactive with the filler but which is decomposable to a sulphur-containing species which is capable of taking part in a sulphur-based curing reaction.

By sulphur-based curing reaction we mean a reaction in which the ethylenically unsaturated organic polymeric material may be cross-linked when heated in the presence of sulphur, and optionally in the presence of other components, e.g. accelerators, conventional in the art.

The sulphur-containing group in the material which is bound to the surface of the particulate filler is decomposable under the chosen conditions of the sulphur-based curing reaction such that when the composition of the invention is mixed with sulphur and optionally with accelerators and other curing aids conventionally used in the sulphur curing art, and the composition is heated in order to effect curing of the organic polymeric material, the sulphur-containing group decomposes and liberates a sulphur-containing species which takes part in the curing reaction and which thus provides a chemical link between the particulate filler and the organic polymeric material of the composition.

In a further embodiment of the invention there is provided a process for the production of a coated particulate filler which process comprises binding to the surface of a particulate filler a material comprising at least one acidic group reactive with the filler which group is linked directly or indirectly to at least one sulphur-containing group which is not reactive with the filler but which is decomposable to a sulphur-containing species which is capable of taking part in a sulphur-based curing reaction.

The invention also provides a coated particulate filler to the surface of which there is bound a material comprising at least one acidic group reactive with the filler which group is linked directly or indirectly to at least one sulphur containing group which is not reactive with the filler but which is decomposable to a sulphur-containing species which is capable of taking part in a sulphur-based curing reaction.

The invention also provides a process for producing the aforementioned composition which process comprises mixing an organic polymeric material which contains ethylenic unsaturation and which is curable by reaction with sulphur and either:

(a) a coated particulate filler to the surface of which there is bound a material comprising at least one acidic group reactive with the filler which group is linked directly or indirectly to at least one sulphur-containing group which is not reactive with the filler but which is decomposable to a sulphur-containing species which is capable of taking part in a sulphur-based curing reaction, or (b) a particulate filler and a material comprising at least one acidic group and at least one sulphur-containing group as described.

In the material containing an acidic group and a sulphur-containing group the groups may be linked directly to each other or they may be linked to a divalent group, for example they may be linked by a hydrocarbon chain, e.g. by an aromatic group or by a divalent alkylene group. The material may contain more than one acidic group and/or more than one sulphur-containing group.

Within the scope of the term acidic groups we include not only acidic groups in the form of a free acid but also salts of acidic groups and groups convertible to free acid groups under the conditions under which the acidic group-containing material is reacted with the particulate filler. Examples of acidic groups include saturated aliphatic carboxylic acid groups, sulphonic acid groups and phosphonic acid groups. An anhydride group is an example of an acidic group which is convertible to an acidic group, that is to a carboxylic acid group.

Suitable materials containing at least one acidic group bound directly or indirectly to at least one sulphur containing group are as follows:

1. Materials comprising a polysulphide group of formula —$(S)_n$—S— where n is an integer of at least 1. For example, the material may be a disulphide (n=1), a trisulphide (n=2), a tetrasulphide (n=3), a pentasulphide (n=4), or a polysulphide in which n is greater than 4. The material may comprise a mixture of different polysulphides. The polysulphide may have the structure

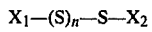

where at least one of the groups $X_1$ and $X_2$, or both of the groups $X_1$ and $X_2$ comprises an acidic group. It is preferred that both of the groups $X_1$ and $X_2$ comprise an acidic group as, on decomposition of the material during the curing reaction, both acidic groups will be attached directly or indirectly to a sulphur-containing species which is capable of taking part in the sulphur curing reaction. Examples of polysulphides include those of formula $HOOC(CH_2)_m(S)_n(CH_2)_m$—COOH where m is an integer of for example 2 to 15, and similar polysulphides comprising sulphonic acid or phosphonic acid groups in place of the carboxylic acid groups. Specific examples include for example 10,10'-bis undecanoic acid polysulphide and 2,2'-bis propionic acid polysulphide.

2. Materials comprising an xanthate group of formula

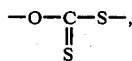

for example materials of formula

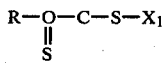

where R is a hydrocarbyl group, e.g. an alkyl or aryl group, and $X_1$ contains an acid group, e.g. a carboxylic acid, sulphonic acid or phosphonic acid group. For example, the material may have the formula

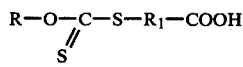

where R is an alkyl or aryl group e.g. ethyl, and $R_1$ is an aromatic group or a group of formula —$(CH_2)_l$—, where l is an integer, for example 2 to 15, or the material may be the corresponding sulphonic acid or phosphonic acid group containing material.

3. Materials comprising a dithiocarbonate group of formula

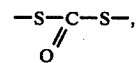

for example materials of formula

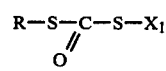

where R is a hydrocarbyl group, e.g. an alkyl or aryl group, and $X_1$ contains an acid group, e.g. a carboxylic acid, sulphonic acid or phosphonic acid group. For example, the material may have the formula

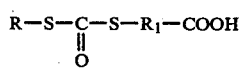

where R is an alkyl or aryl group, e.g. ethyl, and $R_1$ is an aromatic group or a group of formula —$(CH_2)_l$— where l is an integer, for example 2 to 15, or the material may be the corresponding sulphonic acid or phosphonic acid group containing material.

4. Materials comprising a thiocarbonate group of formula

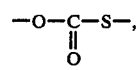

for example, materials of formula

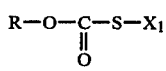

where R is a hydrocarbyl group, e.g. an alkyl or aryl group, and $X_1$ contains an acid group, e.g. a carboxylic acid, sulphonic acid or phosphonic acid group. For example, the material may have the formula

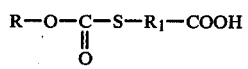

where R is an alkyl or aryl group e.g. ethyl and $R_1$ is an aromatic group or a group of formula —$(CH_2)_l$—, where l is an integer, for example, 2 to 15, or the material may be the corresponding sulphonic acid or phosphonic acid group containing material.

5. Materials comprising a trithiocarbonate group of formula

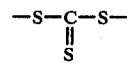

for example materials of formula

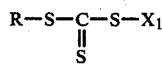

where R is a hydrocarbyl group, e.g. an alkyl or aryl group and $X_1$ contains an acid group, e.g. a carboxylic acid, sulphonic acid or phosphonic acid group. For example, the material may have the formula

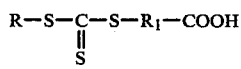

where R is an alkyl or aryl group, e.g. ethyl, and $R_1$ is an aromatic group or a group of formula $-(CH_2)_1-$, where 1 is an integer, for example 2 to 15, or the material may be the corresponding sulphonic acid or phosphonic acid group containing material.

6. Materials comprising a dithiocarbamate group of formula

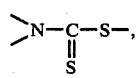

for example materials of formula

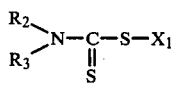

where $R_2$ is H, an alkyl group or an aryl group, and $R_3$ is H an alkyl group or an aryl group, and $X_1$ contains an acid group, e.g. a carboxylic acid, sulphonic acid or phosphonic acid group. For example the material may have the formula

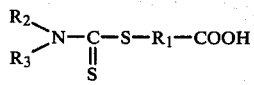

where $R_1$ is an aromatic group or a group of formula $-(CH_2)_1-$ where 1 is an integer, for example 2 to 15, or the material may be the corresponding sulphonic acid or phosphonic acid group containing material.

7. Materials comprising a monothiocarbamate group of formula

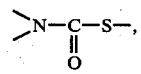

for example materials of formula

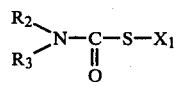

where $R_2$ is H an alkyl group or an aryl group, and $R_3$ is H, an alkyl group or an aryl group, and $X_1$ contains an acid group, e.g. a carboxylic acid, sulphonic acid or phosphonic acid group. For example the material may have the formula

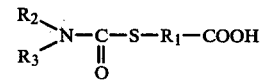

where $R_1$ is an aromatic group or a group of formula $-(CH_2)_1$, where 1 is an integer, for example 2 to 15, or the material may be the corresponding sulphonic acid or phosphonic acid group containing material.

8. Mercaptols of formula

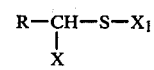

where R is a hydrocarbyl group e.g. an alkyl or aryl group, X is a group $-OH$, $-OR_4$, or $-SR_4$, where $R_4$ is an alkyl group, and $X_1$ contains an acid group, e.g. a carboxylic, sulphonic acid or phosphonic acid group. For example, the mercaptol may have the formula

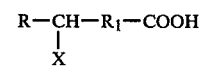

where R is an alkyl or aryl group, e.g. ethyl, and $R_1$ is an aromatic group or a group of formula $-(CH_2)_1-$ where 1 is an integer, for example 2 to 15, or the material may be the corresponding sulphonic acid or phosphonic acid group containing compound. Mercaptoles of formula

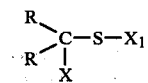

where the groups R are hydrocarbyl groups, e.g. alkyl or aryl, X is a group $-OH$, $-OR_4$ or $-SR_4$, where $R_4$ is an alkyl group, and $X_1$ contains an acid group, e.g. a carboxylic acid, sulphonic acid, or phosphonic acid group.

For example, the mercaptole may have the formula

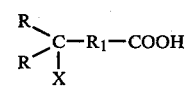

where the groups R are alkyl or aryl groups, e.g. ethyl, and $R_1$ is an aromatic group or a group of formula $-(CH_2)_1-$, where 1 is an integer, for example 2 to 15 or the material may be the corresponding sulphonic acid or phosphonic acid group containing compound.

Materials comprising a thioacetate group of formula

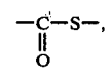

for example materials of formula

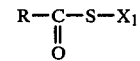

where R is a hydrocarbyl group, for example an alkyl or aryl group, e.g. ethyl, and $X_1$ contains an acid group, e.g. a carboxylic acid, sulphonic acid or phosphonic acid group.

For example, the material may have the formula

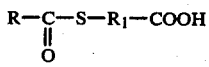

where $R_1$ is an aromatic group or a group $-(CH_2)_l$, where l is an integer, for example 2 to 15, or the material may be the corresponding sulphonic acid or phosphonic acid group containing material.

Materials comprising a dithioacetate group of formula

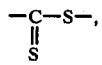

for example materials of formula

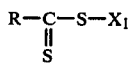

where R is a hydrocarbyl group, for example, an alkyl or aryl group, e.g. ethyl, and $X_1$ contains an acid group, e.g. a carboxylic acid, sulphonic acid, or phosphonic acid group.

For example, the material may have the formula

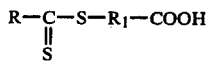

where $R_1$ is an aromatic group or a group $-(CH_2)_l$ where l is an integer, for example 2 to 15, or the material may be the corresponding sulphonic acid or phosphonic acid group containing material.

Materials comprising an isothiouronium group of formula

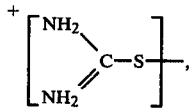

for example materials of formula

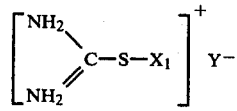

where $X_1$ contains an acid group, e.g a carboxylic acid, sulphonic acid, or phosphonic acid group, and Y is an anion. For example, the the material may have the formula

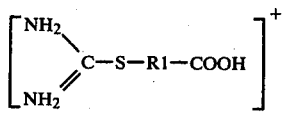

$Y^-$ where $R_1$ is an aromatic group or a group $-(CH_2)_l-$, where l is an integer, for example 2 to 15, or the material may be the corresponding sulphonic acid or phosphonic acid group containing material.

Any particulate filler may be used provided that the acidic group—containing material is capable of being bound to the surface of the filler. The filler may be for example a siliceous filler, e.g. silica or siliceous clay, which is believed to bind to the acidic group-containing material by hydrogen bonding. However, it is preferred that the filler is a basic particulate filler. In this case it is believed that the acidic group of the acidic group—containing material reacts with the basic particulate filler with the result that the material is bound to the surface of the filler. The basic particulate filler may be, for example, an oxide, a hydroxide, a carbonate or a basic carbonate. Suitable basic fillers include oxides, hydroxides, carbonates and basic carbonates of alkaline earth metals and of aluminium and zinc, and especially carbonates. Preferred carbonates are the carbonates of calcium and magnesium, especially calcium carbonate. A suitable hydroxide is magnesium hydroxide. The filler particles may be of natural or synthetic origin. For example, calcium carbonate may be in the form of ground chalk or in the form of a precipitated calcium carbonate prepared by carbonation of milk of lime. Mixtures of particulate fillers may be used.

The filler particles for use in the invention may have any form suitable for use as a filler, and may have a wide variety of particle shapes and sizes. For example, they may be of substantially spherical shape, though they may if desired be of fibrillar or laminar form.

Most commonly the filler particles will have a size in the range 40 Angstrom to 1 mm, though we prefer, on account of the superior reinforcing effect, that the particle size is in the range 40 Angstrom to 1000 Angstrom, for example about 200 Angstrom.

Most conveniently the particulate filler is in the form of a finely divided, free flowing powder, and this is the form in which such fillers are usually available in commerce.

The particulate filler to the surface of which there is bound a material containing an acidic group and a sulphur-containing group may be produced in general by forming a mixture of the filler and the material. The mixture may be heated in order to assist binding although heating may not be necessary, especially where a solvent or dispersant for the acidic group-containing material is used and/or the acidic group is particularly reactive.

Furthermore, a temperature sufficiently high to result in decomposition of the sulphur-containing group should not be used as this decomposition should be effected only during curing of the composition of the invention.

It is preferred to effect the binding in the presence of a solvent for the acidic group-containing material as this assists the formation of an even coating of the material on the surface of the particulate filler. The sulphur-containing group in the material should be such that it will not react with the particulate filler during the coating process otherwise it will not be available for use during the curing reaction when the polymer composition containing the coated particulate filler is cured.

For economic reasons, and for reasons of ease of handling and absence of toxicity, it is preferred to effect the reaction in the presence of water as a solvent and thus it is preferred that the acidic group-containing sulphur group-containing material is soluble in water. To assist solubility in water the acid group-containing material may be in the form of a salt, e.g. an alkali metal or ammonium salt. When the acidic group reacts with the particulate filler the resultant metal salt which is formed should be insoluble in water, otherwise the material will not be bound to the surface of the filler.

For example, where the filler is a calcium compound, for example calcium carbonate, the calcium salt of the acid group in the acid group-containing material should be insoluble in water. The particulate filler should of course itself be insoluble in whatever solvent or dispersant is chosen in which to effect the reaction. It is desirable that the proportion of solvent should be sufficient to dissolve the acidic group-containing material, as incomplete solution may result in undesirable local concentration of unreacted material, and be sufficient to produce a solution which can readily flow and mix with the filler particles. Suitable proportions may be determined by simple trial and are not necessarily critical.

It is also important that the amount of solution containing the acidic group-containing material which is used should be sufficient to cover the surface of the filler particles as thoroughly as possible if the best products, that is the most useful fillers, are to result. Conveniently an excess of solution sufficient to produce a thoroughly wetted mixture may be used.

The coated particulate filler may be separated from the solution, for example, by filtration, and dried, or the mixture may be spray dried.

The binding may be carried out in the presence of protecting agents, e.g. antioxidants, and/or in an inert atmosphere, e.g. nitrogen, argon or solvent vapour, if it is desired to guard against deterioration of the acidic group-containing material during any heating that may be necessary.

The proportion of the acidic group-containing sulphur group-containing material and the filler particles may be varied within wide limits according to the particular materials employed and the properties desired in the composition in which the coated filler particles may ultimately be incorporated.

Commonly, the coated filler particles contain in the range 0.2% to 40% by weight of the acidic group-containing sulphur group-containing material and correspondingly 99.8% to 60% by weight of the particulate filler, though products having proportions outside this range may be made if desired. Preferred proportions are in the range 1% to 20% by weight of the material bound to the particulate filler, more preferably 1% to 10% by weight.

When the acidic group-containing material has been applied to and bound to the surface of the filler particles, the resulting product may be in a form in which it can be used directly as a filler or it may need to be treated mechanically, e.g. by grinding, to break up agglomerates and reduce the filler to a suitably small particle size. This is not essential in all cases, however, as any necessary breakdowns of the agglomerates may take place satisfactorily while the filler is being incorporated into a polymer composition, for example by milling.

The organic polymeric material into which the coated particulate filler is incorporated to form the composition of the invention may be in any convenient form and the incorporation may be carried out by conventional mixing means. The organic polymeric material may be mixed with the particulate filler to the surface of which the acidic group-containing sulphur group-containing material has already been bound, or it may be mixed with the particulate filler and with the material and the binding of the latter to the filler may be effected in situ in the presence of the organic polymeric material.

The organic polymeric material contains ethylenic unsaturation and is curable, that is cross-linkable, by reaction with sulphur. Suitable organic polymeric materials include natural rubber and synthetic rubbers, for example, butadiene-based rubbers, e.g. butadiene-styrene and butadiene acrylonitrile rubbers, and polybutadiene, isoprene-based rubbers e.g. polyisoprene, and ethylene-propylene-diene rubbers.

The mixing may be affected by conventional means, for example by use of a bladed mixer, or twin-roll mill, but mixing is preferably completed on a twin-roll mill as conventionally used in rubber processing technology.

The optimum proportion of organic polymeric material to coated particulate filler will depend on the use to which the filled polymer composition is to be put. In general 5% to 300% of coated filler by weight of organic polymeric material will suffice, preferably 10% to 200% by weight.

During the aforementioned mixing process curing agents may be incorporated into the composition. Curing agents, which may be used, for example sulphur, zinc oxide, stearic acid and one or more accelerators, may be those conventionally used in the art.

The temperature used in the mixing process should not be so high that premature cure of the composition takes place. Furthermore, the temperature used during the mixing process should not be so high that the sulphur-containing group decomposes prematurely. Preferably the temperature used during the mixing process is as low as possible consistent with achieving adequate mixing of the components of the composition.

After the composition has been formed it may be moulded into a desired shape and heated in order to effect cure of the organic polymeric material and decomposition of the sulphur-containing group, the latter group taking part in the curing reaction.

The invention is illustrated by the following Examples in which all parts are expressed as parts by weight.

EXAMPLE 1

3.6 parts of 10,10'-bis undecanoic acid polysulphide (comprising 30% by weight of trisulphide, 60% by weight of tetrasulphide and a total of 10% by weight of disulphide and pentasulphide and prepared by reacting bromoundecanoic acid with sodium tetrasulphide in water) were dissolved in 40 parts by weight of a 1.5% by weight aqueous sodium hydroxide solution and the resultant solution was added to a stirred slurry of 120 parts by weight of calcium carbonate in 700 parts by weight of water at a temperature of 65° C. The calcium carbonate had a particle size of 0.075 microns and had been prepared by carbonation of milk of lime with gaseous carbon dioxide. After stirring for 15 minutes the slurry was filtered and the resultant coated calcium carbonate containing 3% by weight of coating was dried to constant weight by heating in vacuum at 65° C.

A rubber composition was then prepared by compounding on a twin-roll mill:
SBR rubber: (100 parts)
ZnO: (5 parts)
Stearic acid: (1 part)
Vulcafor F accelerator: (2 parts)
Sulphur: (2.5 parts), and
coated calcium carbonate prepared as described above: (75 parts)

The sulphur was the last of the components to be incorporated into the composition.

The rubber composition was then formed into a sheet of 2 mm thickness and cured by heating in a mould in a hydraulic press at a temperature of 153° C. for 14 minutes. Samples of the thus produced sheet were used in the measurement of tensile strength, tensile modulus, elongation at break, hardness, resilience and tear strength. A similarly produced sheet having a thickness of 9 mm but which had been cured by heating at a temperature of 153° C. for 18 minutes was used in the measurement of abrasion resistance.

The properties of the cured rubber composition were as follows:

Tensile strength kg cm$^{-2}$: 70
Tensile modulus 300% kg cm$^{-2}$: 33
Elongation at break %: 575
Hardness BS: 70.5
Resilience % at 20° C.: 60
Tear strength kg mm$^{-1}$: 2.92
Abrasion, volume loss mm$^3$: 336

By way of comparison the above procedure was repeated to prepare a rubber composition except that the coated calcium carbonate used above was replaced by a precipitated calcium carbonate having a conventional stearate coating (3% by weight of coating).

The properties of the cured rubber composition were as follows:

Tensile strength kg cm$^{-2}$: 47
Tensile modulus 300% kg cm$^{-2}$: 14
Elongation at break %: 653
Hardness BS: 61.5
Resilience % at 20° C.: 50.1
Tear strength kg mm$^{-1}$: 1.55
Abrasion, volume loss mm$^3$: 370

EXAMPLES 2 AND 3

The procedure of Example 1 was repeated in two separate examples except that the coating of 10,10'-bis undecanoic acid polysulphide on the calcium carbonate was replaced respectively by 11-xanthato undecanoic acid (Example 2), and by a carboxylated polybutadiene containing xanthate groups (Example 3) (prepared by partial bromination of a carboxylated polybutadiene and replacement of the bromine group by reaction with potassium xanthate to form xanthate groups on the carboxylated polybutadiene).

The properties of the cured rubber composition were as follows:

|  | Example 2 | Example 3 |
|---|---|---|
| Tensile strength kg cm$^{-2}$ | 55 | 90 |
| Tensile modulus 300% kg cm$^{-2}$ | 18 | 46 |
| Elongation at break % | 645 | 535 |
| Hardness BS | 62.5 | 72 |
| Resilience % at 20° C. | 56.7 | 64 |
| Tear strength kg mm$^{-1}$ | 2.15 | 3.3 |
| Abrasion, volume loss mm$^3$ | — | 288 |

EXAMPLES 4 to 9

In six separate examples rubber compositions were prepared by compounding on a twin-roll mill SBR rubber: (100 parts)
Zno: (5 parts)
Stearic acid: (1 part)
Vulcafor F accelerator: (2 parts)
Sulphur: (2.5 parts)
Calcium carbonate: (75 parts)
(Calofort U, particle Size 0.07 micron)

and, in the separate examples, the following acid group-containing sulphur group-containing materials.

Example 4. 2-carboxy ethyl thiosulphate sodium salt.
Example 5. Ethyl sulphonic acid disulphide.
Example 6. 2-carboxy ethyl ethyl xanthate.
Example 7. Tetrathio diglycolic acid.
Example 8. Tetrathio dibutyric acid.
Example 9. Dithio dibutyric acid. The proportion of acid group-containing sulphur group-containing material used in each example was 1 part for every 30 parts of calcium carbonate.

Each rubber composition was then moulded and cured by following the procedure described in Example 1.

The properties of the cured rubber compositions are as shown in Table 1. For the purposes of comparison Table 1 also includes the properties of a rubber composition prepared following the above-described procedure except that the calcium carbonate used was an uncoated ground calcium carbonate having a particle size of 0.07 microns.

TABLE 1

|  | Example 4 | Example 5 | Example 6 | Example 7 | Example 8 | Example 9 | Comparison |
|---|---|---|---|---|---|---|---|
| Tensile strength kg cm$^{-2}$ | 54 | 48 | 58 | 60 | 60 | 53.2 | 50 |
| Tensile modulus 300% kg cm$^{-2}$ | 28 | 21 | 28 | 43.5 | 41 | 31.5 | 17 |
| Elongation at break % | 552 | 550 | 601 | 430 | 430 | 550 | 612 |
| Hardness BS | 68 | 64 | 70 | 73 | 71 | 70.5 | 61 |
| Resilience % at 20° C. | 65.2 | 58.1 | 58.7 | 69.5 | 67 | 65 | 57.5 |
| Tear Strength kg mm$^{-1}$ | 2.85 | 1.95 | 2.8 | 3.2 | 3.2 | 2.8 | 1.7 |
| Abrasion, volume loss mm$^3$ | 410 | — | 437 | 417 | 435 | — | 478 |

EXAMPLE 10

The procedure of Example 1 was repeated to produce a calcium carbonate coated with 3% by weight of an n-butyl dithiocarbamate derivative of undecanoic acid in place of the polysulphide of Example 1, in the production of the coated calcium carbonate the sodium salt of the undecanoic acid derivative being used, and thereafter the procedure of Example 1 was followed to produce a cured rubber composition containing the coated calcium carbonate. The properties of the cured rubber composition were as follows:

Tensile strength kg cm$^{-2}$: 79
Tensile modulus 300% kg cm$^{-2}$: 40
Elongation at break %: 543
Hardness BS: 73
Resilience % at 20° C.: 60
Tear strength kg mm$^{-1}$: 2.7
Abrasion, volume loss mm$^3$: 506

EXAMPLE 11

The procedure of Example 4 was followed to produce a cured rubber composition except that the 2-carboxy ethyl thiosulphate sodium salt of Example 4 was replaced by 1 part of an n-butyl dithiocarbamate derivative of undecanoic acid for every 25 parts of calcium carbonate.

The properties of the cured rubber composition were as follows:
Tensile strength kg cm$^{-2}$: 51
Tensile modulus 300% kg cm$^{-2}$: 41
Elongation at break %: 462
Hardness BS: 77
Resilience % at 20° C.: 55
Tear strength kg mm$^{-1}$: 2.3

EXAMPLE 12

The procedure of Example 11 was followed except that the n-butyl dithiocarbamate derivative of undecanoic acid was replaced by 1 part of a sodium salt of an isothiouronium derivative of undecanoic acid for every 30 parts of calcium carbonate.

The properties of the cured rubber composition were as follows:
Tensile strength kg cm$^{-2}$: 72
Tensile modulus 300% kg cm$^{-2}$: 42
Elongation at break %: 548
Hardness BS: 77
Resilience % at 20° C.: 49
Tear strength kg mm$^{-1}$: 2.75
Abrasion, volume loss mm$^3$: 472

We claim:

1. A basic particulate filler to the surface of which there is bound through reaction with an acidic group which is part of a material comprising at least one acidic group reactive with the filler which acidic group is linked directly or indirectly to at least one sulphur containing group which is not reactive with the filler but which is decomposable to a sulphur-containing species which is capable of taking part in a sulphur-based curing reaction, in which the acidic group is selected from the group consisting of a saturated aliphatic carboxylic acid group, a salt thereof, and an anhydride thereof, and in which the sulphur-containing group is selected from the group consisting of a polysulphide group, a xanthate group, a thiocarbonate group, a dithiocarbonate, a trithiocarbonate group, a monothiocarbamate group, a dithiocarbamate group, a mercaptol group, a mercaptole group, a thioacetate group, a dithioacetate group, and an isothiouronium group.

2. A filler as claimed in claim 1 in which the material bound to the surface of the filler is 10,10'-bis undecanoic acid polysulphide, 11-xanthato undecanoic acid, a carboxylated polybutadiene containing xanthate groups, a sodium salt of 2-carboxy ethyl thiosulphate, ethyl sulphonic acid disulphide, 2-carboxyethyl ethyl disulphide, tetra thiodiglycolic acid, tetra-thiodibutyric acid, dithiodibutyric acid, an n-butyl dithiocarbonate derivative of undecanoic acid, or a sodium salt of an isothiouronium derivative of undecanoic acid.

3. A filler as claimed in claim 1 in which the filler is calcium carbonate.

4. A filler as claimed in claim 3 in which the filler particles have a size in the range 40 angstrom to 1 mm.

5. A filler as claimed in claim 1 comprising 0.2% to 40% by weight of acidic group-containing sulphur group-containing material and 99.8% to 60% by weight of basic particulate filler.

6. A filler as claimed in claim 5 comprising 1% to 20% by weight of acidic group-containing material and 99% to 80% by weight of particulate filler.

7. A process for the production of a coated particulate filler which process comprises binding to the surface of a basic particulate filler through reaction with an acidic group which is part of a material comprising at least one acidic group reactive with the filler which acidic group is linked directly or indirectly to at least one sulphur-containing group which is not reactive with the filler but which is decomposable to a sulphur-containing species which is capable of taking part in a sulphur-based curing reaction, in which the acidic group is selected from the group consisting of a saturated aliphatic carboxylic acid group, a salt thereof, and an anhydride thereof, and in which the sulphur-containing group is selected from the group consisting of a polysulphide group, a xanthate group, a thiocarbonate group, a dithiocarbamate, a trithiocarbamate group, a monothiocarbonate group, a dithiocarbonate group, a mercaptol group, a mercaptole group, a thioacetate group, a dithioacetate group, and an isothiouronium group said binding being accomplished by forming a mixture of said filler and said material, and optionally heating the mixture during mixing at a temperature such that premature curing of the mixture and decomposition of the sulphur-containing group is avoided.

8. A process as claimed in claim 7 in which the binding is effected in the presence of a solvent for the acidic group-containing sulphur group-containing material.

9. A process as claimed in claim 7 which is effected in the presence of water as solvent.

* * * * *